United States Patent

[11] 3,624,365

[72] Inventor William H. Woodworth
China Lake, Calif.
[21] Appl. No. 843,120
[22] Filed July 18, 1969
[45] Patented Nov. 30, 1971
[73] Assignee The United States of America as
represented by the Secretary of the Navy

[54] VERTICAL ATTITUDE MEASURING DEVICE
2 Claims, 1 Drawing Fig.
[52] U.S. Cl. ................................................. 235/150.2,
33/204 BA, 73/503
[51] Int. Cl. ..................................................... G06g 7/38,
G01c 9/12
[50] Field of Search .......................................... 235/150.2

[56] References Cited
UNITED STATES PATENTS
3,350,548  10/1967  Whitaker.....................  235/150.2

Primary Examiner—Eugene G. Botz
Assistant Examiner—R. Stephen Dildine, Jr.
Attorneys—Edgar J. Brower, Roy Miller and Harry I. Jacobs ABSTRACT: A device for detecting the angular variation of an aerodynamic vehicle measured from a line normal to the surface of the earth utilizing a rate gyro, an angle of roll means and an integrating amplifier. The signal received from the rate gyro is integrated. The integrator output is summed with the output of the angle of roll means, and fed back to the input of the integrator. The integrator output now is proportional to the angle of roll of the aerodynamic vehicle.

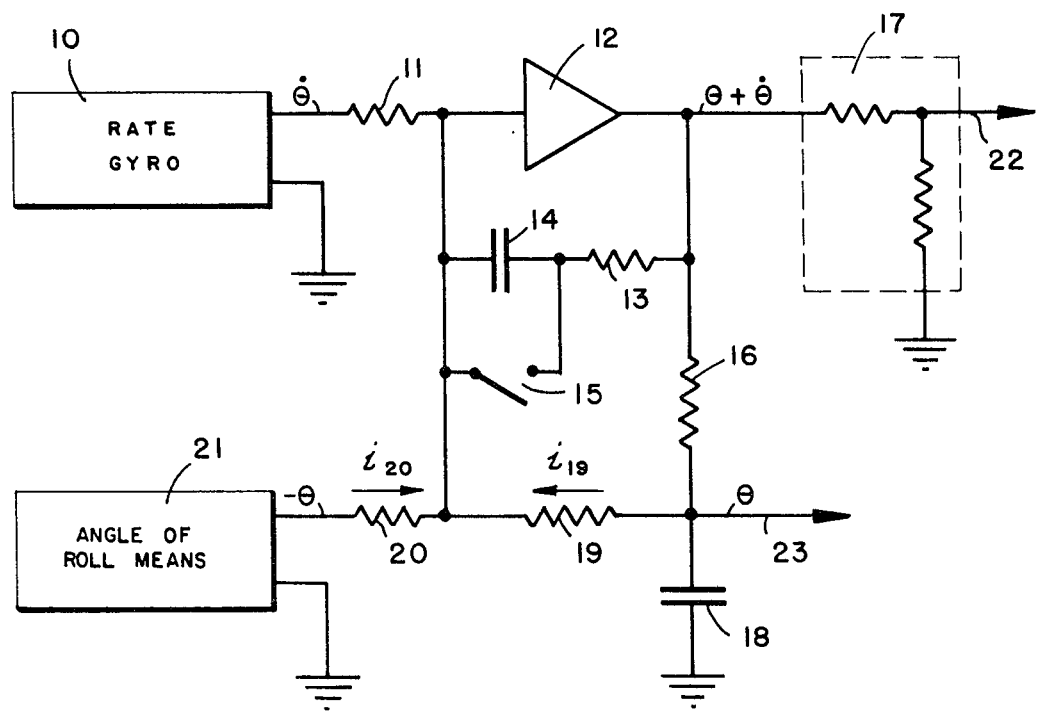
INVENTOR.
WILLIAM H. WOODWORTH
BY ROY MILLER
HARRY I. JACOBS
ATTORNEYS.

VERTICAL ATTITUDE MEASURING DEVICE

GOVERNMENT INTEREST

The invention described herein may be manufactured and used by or for the government of the United States of America for governmental purposes without the payment of any royalties thereon or therefor.

BACKGROUND OF THE INVENTION

In an aerodynamic vehicle it is frequently desirable to measure the roll angle from a line normal to the surface of the earth. The simplest method of measuring the roll angle would be a horizontally mounted accelerometer. However, when the vehicle maneuvers in a turn, the gravity vector is changed and the accelerometer indicates a false direction.

The output of a roll rate gyro may be integrated to measure roll angle. For this case, an initial condition is set into the integrator to correspond to zero roll angle. However, the rate gyro-integrator combination is subject to time drift of position due to null offset of the gyro and drift of the integrator.

The combination described herein is intended to provide the advantages of a spatially referenced gyro with automatic alignment or erection means provided by an accelerometer. In this manner it is analogous to a conventional, self-erecting, free gyro.

SUMMARY OF THE INVENTION

In accordance with the present invention, the output from a roll rate gyro is integrated and summed with the output from a simple angle of roll means to subtract the output of the angle of roll means from the integrated output. The difference signal is fed back to the input of the integrator. The output of the integrator is therefore proportional to the roll angle of the aerodynamic vehicle.

BRIEF DESCRIPTION OF THE DRAWING

The single FIGURE shows a schematic diagram of a vertical attitude measuring device according to the present invention.

DESCRIPTION OF THE PREFERRED EMBODIMENTS

Referring to the FIGURE, consider a simple roll rate gyro system comprising rate gyro 10, resistor 11, integrating amplifier 12 and capacitor 14.

Let $\dot{\theta}$ = rate gyro input in degrees/sec.
$\theta$ = angular output in degrees
$K_g$ = gyro sensitivity in volts/deg/sec. and
$K_o$ = output constant in volts/deg.

The angular output of such a system is $$\theta = \frac{K_g}{K_o R_{11} C_{14}} \int_0^t \dot{\theta} dt$$

since $$\int_0^t \dot{\theta} dt = \theta$$

then, substituting $$\frac{K_g}{K_o} = R_{11} C_{14}$$

If a feedback resistor, $R_{19}$ is placed across the integrating amplifier, the output angle due to gyro offset $\theta_o$ is limited because $R_{19}$ limits the voltage gain of the integrating amplifier to the ratio $R_{19}/R_{11}$.

Thus $$\theta_o = \frac{\dot{\theta} K_g R_{19}}{K_o R_{11}}$$

and $$\theta_o = R_{19} C_{14} \dot{\theta}_e$$

where $\dot{\theta}_e$ = rate gyro null offset.

The system incorporating a feedback resistor will settle towards $\theta_o$, or in other words, will erect itself to a small angle regardless of its angular orientation with respect to the gravity vector.

By incorporating a simple angle of roll means 21, a true vertical indicator can be made.

As shown in the FIGURE, rate tyro 10 is connected through input resistor 11 to integrating amplifier 12. Integrating capacitor 14, with initial condition switch 15 shunted across, is connected in series with resistor 13, and the combination shunted across the input and output of integrating amplifier 12. Feedback resistor 19 is placed in series with resistor 16 and the combination placed in parallel with the series combination of capacitor 14 and resistor 13. Angle of roll means 21 is connected through resistor 20 to the input side of feedback resistor 19. Output 22 from integrator 12 is reached via voltage divider 17. A second output is provided from the junction of resistors 19 and 16, which junction is grounded via capacitor 18.

The output of angle of roll means 21 is chosen to provide an input current $i_{20}$, which is equal and opposite to the current fed back by the feedback resistor, $i_{19}$. This requires that the value of $R_{20}$ be chosen so that $$R_{20} = \frac{R_{19} K_a}{K_o}$$

where $K_a$ = angle of roll means sensitivity in volts/degree.

In this arrangement, if the angular feedback currents $i_{19}$ and $i_{20}$ are equal and opposite, they cancel each other at the input to integrator 12. If they are not equal, the output of integrator 12 will change to make them equal. Therefore, the integrator output "erects" to the angle determined by the angle of roll means. This function is analogous to a conventional self-erecting vertical gyro.

The roll angle $\theta$ is measured at output 23.

The output at 22 can be used to drive servos and torquers to adjust the roll angle of an aerodynamic vehicle to be zero.

What is claimed is:

1. A device for measuring the vertical attitude of an aerodynamic vehicle comprising:
   means for producing an electronic signal proportional to the roll angle of the vehicle measured from a line normal to the surface of the earth;
   means for producing an electronic signal proportional to the rate of change of the roll angle of said aerodynamic vehicle, comprising a rate gyro;
   an integrator;
   means for applying the electronic signal proportional to the rate of change of the roll angle of said aerodynamic vehicle to the input of said integrator to produce an output;
   means for summing said output and the electronic signal proportional to the roll angle of the vehicle measured from a line normal to the surface of the earth to obtain their difference; and
   means for applying said sum to the input of said integrator to produce an output proportional to the vertical attitude of said aerodynamic vehicle.

2. The device as set forth in claim 1 wherein the means for producing an electronic signal proportional to the roll angle of the vehicle measured from a line normal to the surface of the earth comprises an accelerometer.

* * * * *